United States Patent

Harding

[11] Patent Number: 6,017,498
[45] Date of Patent: Jan. 25, 2000

[54] CATALYTIC CONVERTER SUPPORT DEVICE

[75] Inventor: Raymond C. Harding, North Brunswick, N.J.

[73] Assignee: Metex Mfg. Corporation, Edison, N.J.

[21] Appl. No.: 09/007,132

[22] Filed: Jan. 14, 1998

[51] Int. Cl.[7] .......................... B01D 50/00; B01D 53/34
[52] U.S. Cl. ................................ 422/179; 422/180
[58] Field of Search ............................ 422/168, 179, 422/311, 221, 222, 169–178, 180; 60/299, 300; 502/439, 527.16, 527.14, 527.22; 428/116, 593, 594; 29/890; 55/DIG. 30

[56] References Cited

U.S. PATENT DOCUMENTS

| | | | |
|---|---|---|---|
| 4,142,864 | 3/1979 | Rosynsky et al. | 422/179 |
| 4,143,117 | 3/1979 | Gaysert | 422/179 |
| 4,328,187 | 5/1982 | Musall et al. | 422/179 |
| 4,335,077 | 6/1982 | Santiago et al. | 422/179 |
| 4,335,078 | 6/1982 | Ushijima et al. | 422/179 |
| 4,444,721 | 4/1984 | Ohkata | 422/179 |
| 4,683,010 | 7/1987 | Hartmann | 148/287 |
| 4,864,095 | 9/1989 | Yamashita et al. | 219/86.24 |
| 4,958,491 | 9/1990 | Wirth et al. | 60/299 |
| 5,094,074 | 3/1992 | Nishizawa et al. | 60/300 |
| 5,355,973 | 10/1994 | Wagner et al. | 181/258 |
| 5,449,500 | 9/1995 | Zettel | 422/179 |
| 5,656,245 | 8/1997 | Fujisawa et al. | 422/179 |
| 5,782,089 | 7/1998 | Machida et al. | 60/299 |

FOREIGN PATENT DOCUMENTS

| | | |
|---|---|---|
| 61-098910 | 5/1986 | Japan . |
| 06088521 | 3/1994 | Japan . |
| 2268695A | 1/1994 | United Kingdom . |

*Primary Examiner*—Marian C. Knode
*Assistant Examiner*—Alexa Doroshenk
*Attorney, Agent, or Firm*—John G. Gilfillan, III; William Squire

[57] ABSTRACT

An automobile exhaust gas ceramic catalytic element support device mounts the element in a metal housing and cushions the element from radial shock loads. The device is compressed knitted wire mesh and includes crimped corrugations formed into a cylinder. The cylinder end has a conduit containing a knitted compacted wire mesh rope formed by drawing knitted wire mesh through a die until the formed rope is compacted into a gas seal. The device at the rope end has a radially inwardly extending lip for engaging an end face of the element. The rope may include non-metallic fibers to enhance sealing action of the rope. The device is axially retained by an annular channel in the converter housing with the rope substantially gas sealing the interface region between the ceramic element and the housing.

20 Claims, 4 Drawing Sheets

CATALYTIC CONVERTER SUPPORT DEVICE

This invention relates to devices used to support a ceramic catalytic converter element in a metal housing used to purify hot vehicle exhaust gases.

A catalytic converter for vehicle exhaust gases typically includes a ceramic element, sometimes referred to as brick, for reacting with hot vehicle exhaust gases for purifying such gases. The element may include channels or other fluid conduits, such as a honeycomb, for passing the hot gases there through. A catalyst is added to the ceramic for performing the desired catalytic function.

A cushioning member is typically used to support the ceramic element in the metal converter housing to serve as a shock absorber. It is undesirable that hot gases flow between the ceramic element and the housing. A number of different approaches are taken by the prior art in providing such cushioning support for the ceramic element and for precluding the hot gases from flowing between the element and housing.

In U.S. Pat. No. 5,449,500, for example, a support mat is between the catalytic converter housing and ceramic brick. The support mat has a leading edge. A barrier strip is attached to the leading edge for protecting the leading edge from excessive wear due to the hot exhaust gases flowing over the leading edge. The barrier strip comprises knitted wire mesh having a body composed of woven flattened wires and woven round wires. The body is enclosed by an outer wire mesh and has a rounded portion and a flattened portion which is tapered. The strip is heat treated which forms carbon deposits on the wire mesh which act as a leak barrier for preventing hot gas from contacting the support mat.

In U.S. Pat. No. 5,656,245, a ceramic honeycomb catalyst carrier is supported by a ring L-shaped in section knitted wire mesh washer at an end flange portion of the carrier. A second ring-shaped knitted wire mesh washer is also included at the carrier one end. A pushing ring is also employed at this end and welded to an outer plate, sandwiching the rings between the outer plate and the pushing ring to secure the carrier to the plate. The washers absorb differences due to thermal expansion and form buffering members.

U.S. Pat. No. 4,335,078 discloses an outer shell having annular corrugations. A honeycomb core is treated with a catalyst for hot gases. A buffer layer of wire mesh is in the space between the core and shell. The corrugations preclude axial displacement of the core and buffer layer. An endmost marginal region of the buffer layer contacts a shoulder of the housing and an end face of the core. The marginal end regions are made of finer wire than the buffer layer and formed as a wire cloth. The marginal region is formed separately from the buffer layer in the form of a belt or strip and stitched to the buffer layer. The buffer layer is wrapped about the core and stitched, bonded or stapled in place.

In U.S. Pat. No. 4,335,077, an elastic jacket made of wire mesh or netting supports a catalytic body and protects it from shock. The catalytic body is supported at its ends by elastic damping rings. The rings are made of wire mesh or wire webbing. In one embodiment, the damping ring is pressed into the desired shape. The support may also be soft fiber material which is compressed and compacted. The fiber layer may be bent radially inwardly and outwardly at both ends. Other embodiments are disclosed including a wire mesh reinforcement in the protective jacket.

Still other catalytic support arrangements are disclosed in U.S. Pat. Nos. 4,328,187, 4,143,117, 4,142,864, 4,864,095, 4,958,491 and 4,444,721.

The present inventor recognizes a need for a simple catalytic ceramic element support structure which is cost effective and exhibits a long life.

A device according to the present invention supports a ceramic catalytic element in a housing of an exhaust gas treatment apparatus, the element having a broad surface and an end face forming a corner with the broad surface, the gas tending to flow in a given direction between the housing and element.

The device comprises a mesh member having a broad side extending in a second direction terminating at opposing ends for supporting at least a portion of the element broad surface in juxtaposed relation between the housing and element. The member has a conduit formed therein extending transverse the second direction and a fluid sealing elongated member is in the conduit and comprises filaments compressed to be substantially fluid impervious for sealing the interface between the housing and the element to preclude the gas flow in the given direction.

In one aspect, a lip is formed integral and one piece with the mesh member at one mesh member end for juxtaposition with the element end face, the lip extending transverse to the mesh member broad side forming a mesh member corner therewith for receiving the element corner.

The conduit and elongated member may be at the mesh member corner and the mesh member preferably is knitted wire mesh. Further, the elongated member preferably comprises a knitted wire mesh and the elongated member preferably is formed of wire of a finer gauge than the wire of the mesh member. Fibrous filaments may be included to further enhance the sealing action of the elongated member. The elongated member is a rope preferably formed of wire and fibrous materials and the mesh member in a further aspect is corrugated to enhance cushioning the element.

IN THE DRAWING

Figure 1:
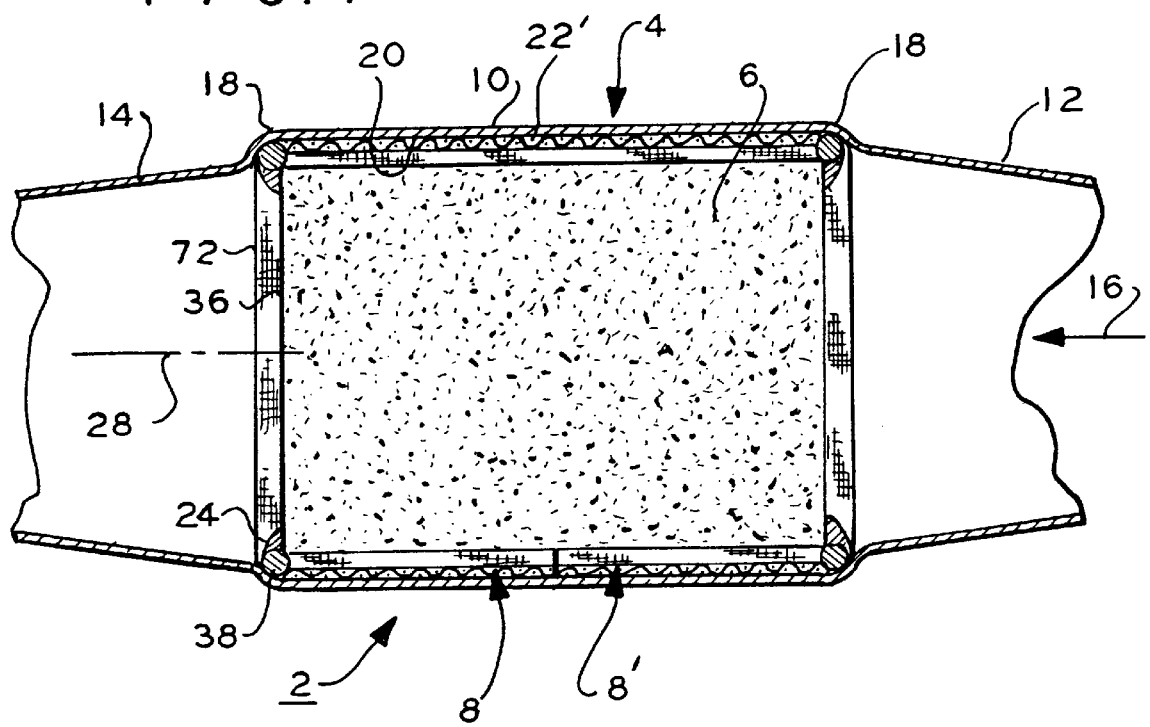
FIG. 1 is a sectional elevation view of a catalytic converter apparatus employing a ceramic catalytic element support device according to an embodiment of the present invention.

In FIG. 1, catalytic converter apparatus 2 is for use with an automobile exhaust system (not shown). The apparatus 2 includes a sheet metal housing 4, preferably stainless steel or other metal for use with hot exhaust gases, a ceramic catalytic converter element 6 and a pair of preferably identical element circular cylindrical support devices 8, 8'. Each device is according to an embodiment of the present invention and is secured in abutting mirror image fashion between the element 6 and housing 4.

The housing 4 has a circular cylindrical central section 10 and a conical inlet port 12 and a conical outlet port 14. Not shown are inlet and outlet pipes connected to the respective inlet and exhaust ports forming the automotive exhaust system. Exhaust gases may be supplied the inlet port 12 in direction 16. The cylindrical section 10 has an annular shoulder 18 at each end forming an annular internal channel 20 in the housing 4. The conical inlet and outlet ports terminate at the shoulders 18. The housing 4 preferably comprises multiple sections which may be welded or riveted together at seams (not shown).

Located centrally within the housing 4 is the ceramic catalytic element 6. The element 6 may have linear or honeycomb channels or cells (not shown) for passing hot exhaust gases through the element from the inlet port 12 to the outlet port 14. A catalyst (not shown) is added to the element for performing gas purification of the hot exhaust gases in a known manner.

Support and cushioning devices 8, 8' are between the element 6 and housing 4 in the channel 20. The shoulders 18 axially retain the coextensive abutting devices 8, 8' in the channel 20. The devices 8, 8' axially retain the element 6 in the channel 20.

Figure 3:
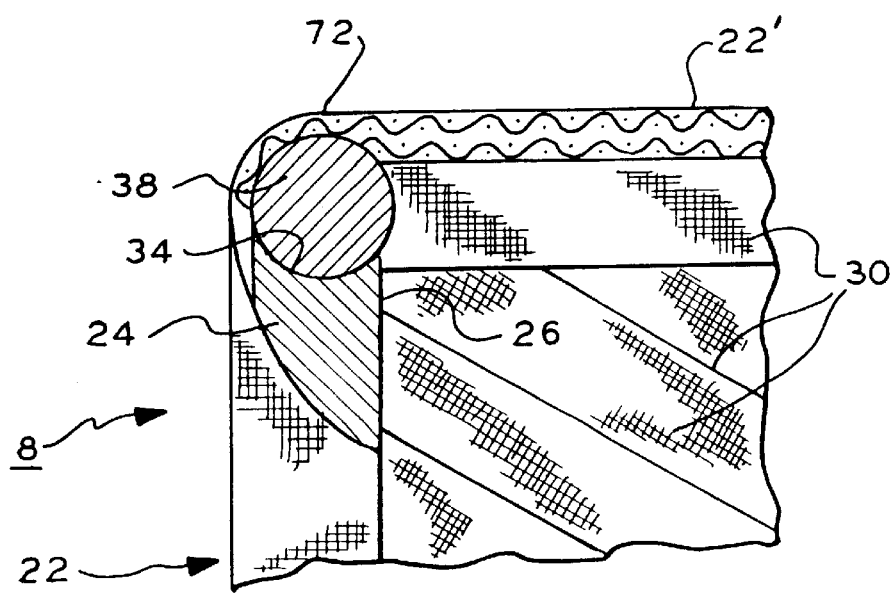
FIG. 3 is a more detailed fragmented sectional elevation view of an end corner portion of the catalytic element support device of FIG. 2 taken at region 3
Figure 2:
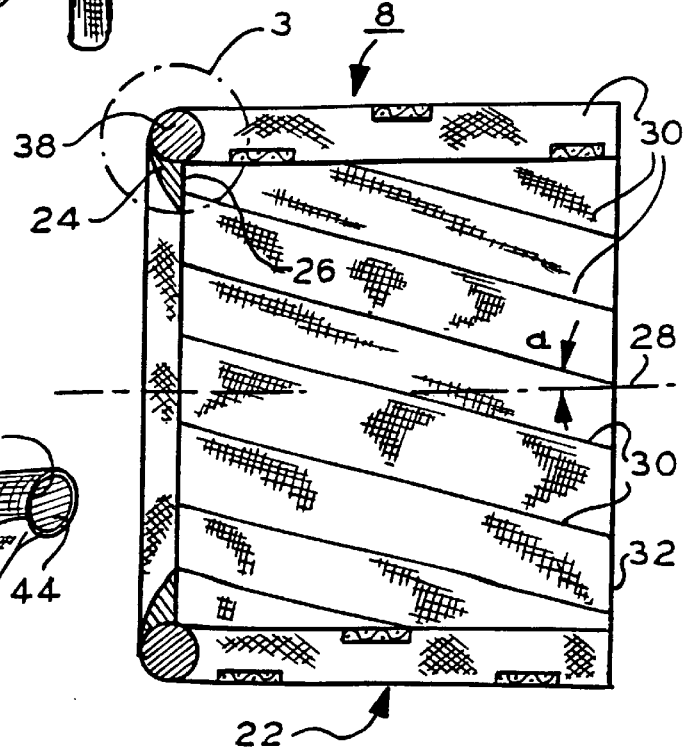
FIG. 2 is a side elevation sectional view of the ceramic element support device of FIG. 1.

The devices 8, 8' are preferably identical and a description of one of the devices 8 is representative. In FIGS. 2 and 3, device 8 comprises a preferably knitted wire mesh circular cylinder 22 and a lip 24 at the end of the cylinder. The lip 24 has a surface 26 which is generally at right angles to the longitudinal axis 28 of the cylinder 22.

The cylinder 22 has a cylindrical portion 22' which preferably comprises two layers of identical knitted wire mesh which layers are compressed to form substantially a single layer. The cylindrical portion 22' is formed with corrugations 30. The corrugations 30 may be at an angle a about 70° with respect to axis 28. The corrugations 30 may be about 1 cm center to center and extend for the axial length of the cylindrical portion 22' between lip 24 surface 26 and distal edge 32. The corrugations 30 form a broad radially outer facing surface and serve as a resilient cushion for absorbing radial shock between the element 6 and housing 4.

An annular conduit 34, FIG. 3, is formed in the device 8 at the junction between the cylindrical portion 22' and lip 24. The conduit is somewhat circular in transverse section, although this shape is not important. The lip 24 is compressed and is relatively rigid as compared to cylindrical portion 22'. The lip 24 forms an annular radially inwardly extending flange having a face surface which overlies the end face 36 of the ceramic element, FIG. 1. The lip 24 axially retains the element along axis 28.

Located within the conduit 34 is a preferably compacted preferably knitted wire mesh rope 38. Rope 38 comprises compressed wire mesh which is sufficiently compacted so as to form a substantially gas tight seal. Hot exhaust gases flowing against the rope generally can not pass therethrough, the rope forming a fluid seal. There may be, however, relatively small leakage through the rope due to its porosity. The rope substantially seals the interface between the element 6 and the housing 4 from the gases flowing in direction 16. The rope 38 is preferably formed of knitted smaller diameter wire than the cylindrical portion 22' and lip 24.

Because the compressed tortuous wire filaments may be porous, the small amounts of gas leakage that may be present is acceptable. To further preclude such leakage, the rope 38 may comprise compressed wire filaments and fibers such as glass or ceramic fibers or synthetic fibers such as aramids some of which are referred to as Kevlar, a trademark of the Du Pont corporation. Other fibers may be used also. The fibers enhance the fluid sealing characteristics of the rope and also are impervious to hot flowing gases.

In practice, the device 8 is preferably fabricated in sheet form in a manner described below and cut to size (length) which forms the cylindrical diameter. The longitudinal edges parallel to axis 28 are overlapped and welded to form a cylindrical structure.

Figure 8:
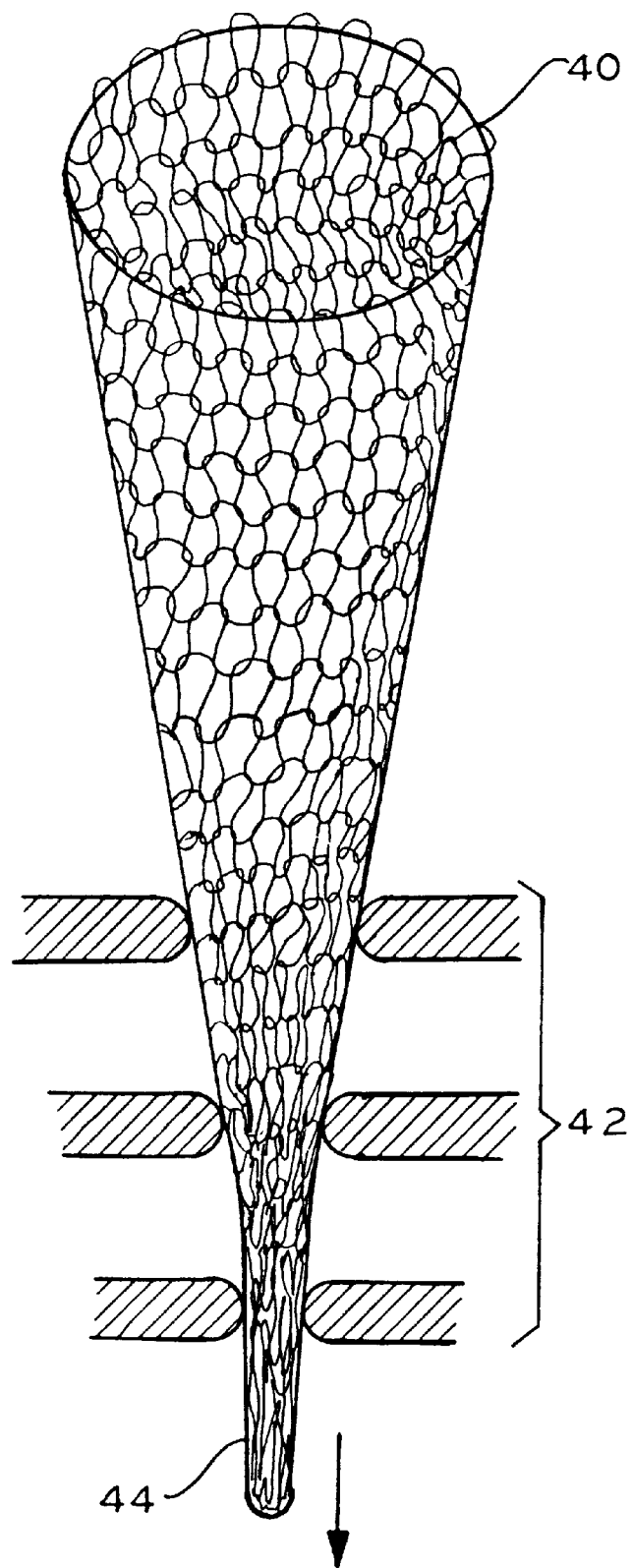
FIG. 8 is a diagrammatic isometric view partially in section illustrating the formation of a rope portion of the device of FIGS. 1 and 4.

In fabricating the rope 38, FIG. 8, a knitted wire mesh tube 40 is fabricated from a conventional knitting machine. Preferably, the wire mesh for the rope 38 is formed with a 76 needle knitting machine. The wire of rope 38 may be 0.15 mm (0.0059 inches) diameter 601 Inconel annealed wire and knitted with about 5.5 to about 7.5 courses per inch.

The knitted tube 40 is passed through a conical die which may be a set of dies 42 with a combined conical bore or a single cone (not shown). The wire mesh tube 40 is drawn through dies 42 of different diameters, for example, from $\frac{5}{8}$ inch diameter until the final rope diameter of about 0.275 inches in this embodiment is obtained. This produces a compacted compressed wire mesh rope 44 with the desired fluid sealing properties. The rope is flexible.

Figure 4:
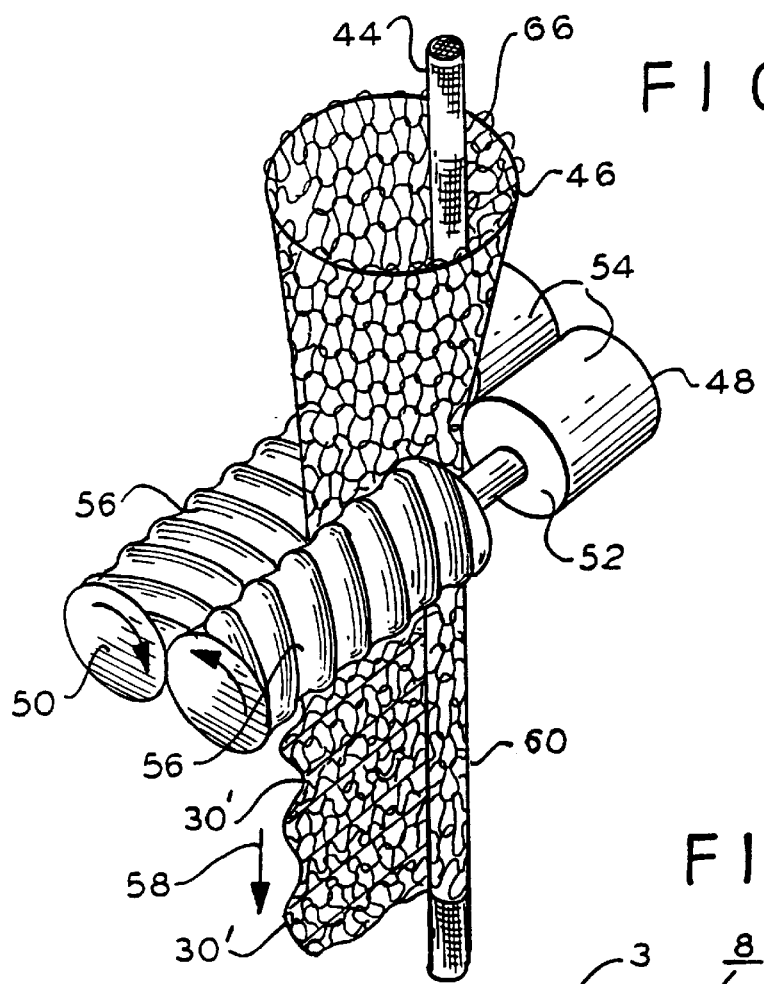
FIG. 4 is a diagrammatic isometric view of an intermediate stage of the process for forming the device of FIG. 1.

In FIG. 4, a tube 46 of knitted wire mesh is formed. Tube 46 is preferably formed of 0.25 mm (0.0098 inch) diameter 750 annealed Inconel wire. This tube 46 is formed preferably with a 28 needle knitting machine at about 6.25 courses per inch.

The tube 46 is then passed between roller dies 48 and 50. The dies 48 and 50 have a groove 52. A smooth cylindrical roll 54 is formed at one end of each die 48 and 50 on one side of the groove 52.

Figure 5:
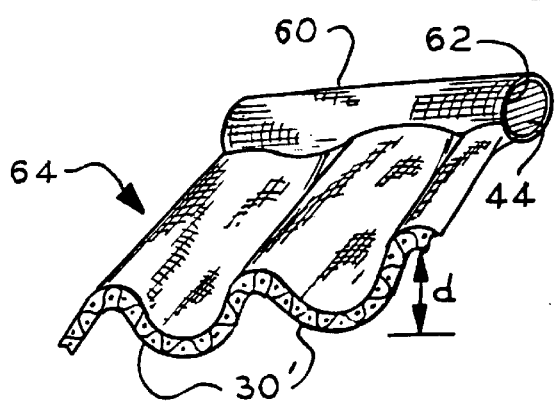
FIG. 5 is an isometric view of a fragmented sectional portion of the device of FIG. 6.

Mating identical helical grooves 56 are formed in an end portion of each die 48 and 50 distal the rolls 54. The grooves 56 form the corrugations 30'. The tube 46 and rope 44 are passed through the rotating dies 48 and 50 in direction 58. The rope 44 is located within the core of the tube 46 adjacent to one edge 60 thereof. As the rope 44 and tube 46 pass through and between the dies 48 and 50, the tube 46 is compacted and crimped about the rope forming a conduit 62, FIG. 5, containing the rope 44.

At the same time two layers of wire mesh form the corrugations 30, 30'. The corrugations 30, 30' are inclined relative to the normal to the longitudinal dimension of the rope at angle a, FIG. 2. The resulting crimped structure is a flat sheet 64, FIG. 5, with crimped corrugations 30' and rope 44 crimped to the sheet 64 at edge 60, in conduit 62. Preferably, the corrugations 30' in this example have a depth d of about 6 mm.

Figure 7:
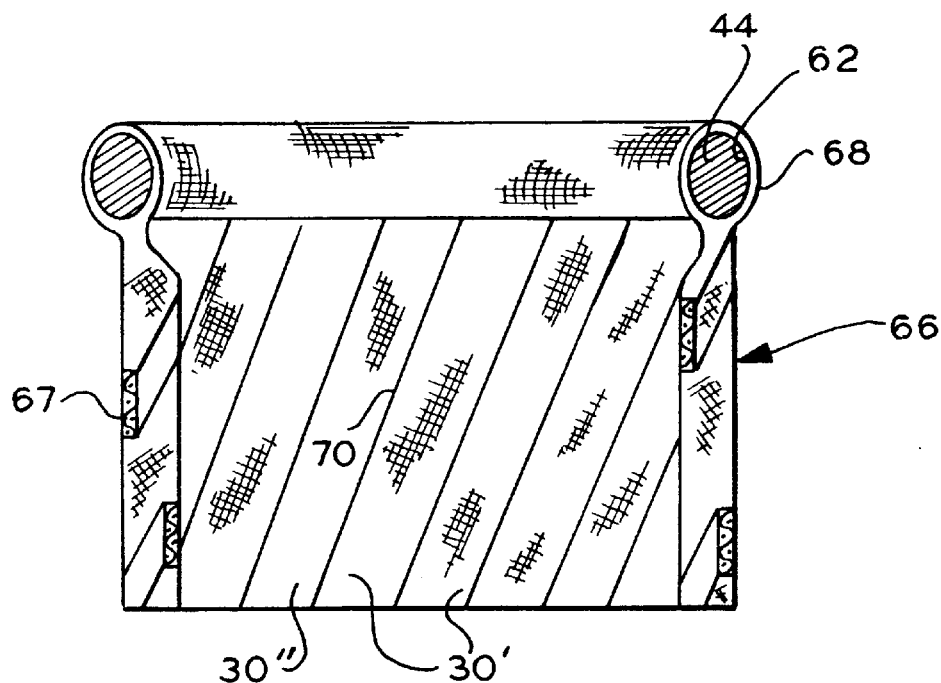
FIG. 7 is an elevation sectional view of the device of FIG. 6 taken along lines 6—6.
Figure 6:
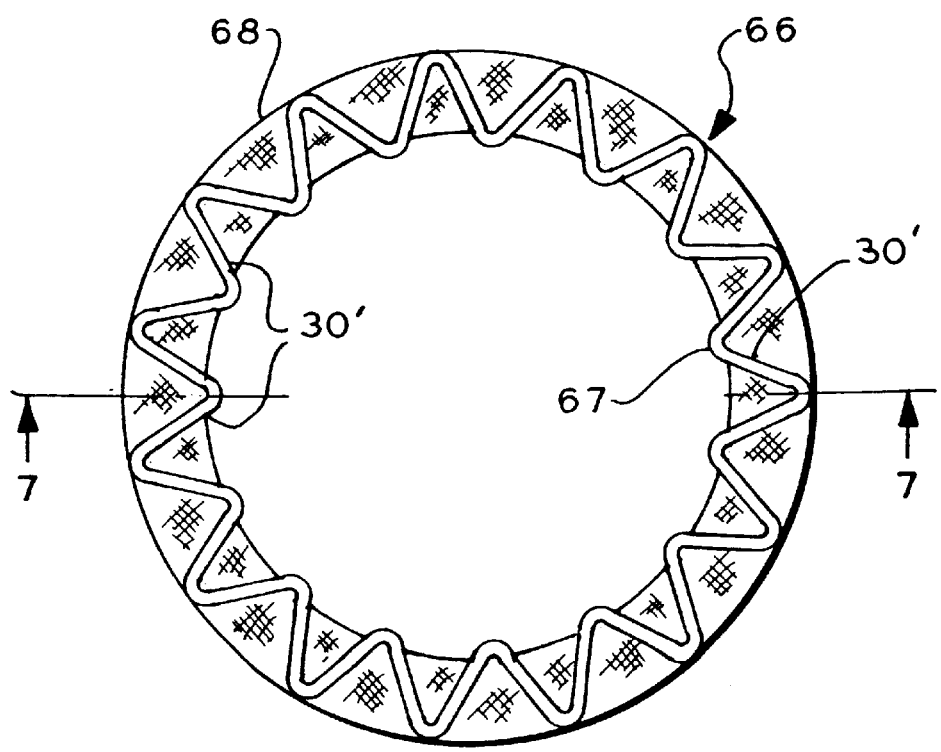
FIG. 6 is a plan bottom view of the device produced by the process of FIG. 4.

The flat crimped sheet 64, FIGS. 6 and 7, with the captured rope 44 is then cut to length to form a cylinder of a given diameter. A crimp corrugation 30" at one sheet edge 70 is overlapped with a crimp corrugation at the other edge and welded to form cylinder 67. The rope portion 68 of the sheet is abutted edge to edge and welded. This produces a cylindrical preform 66.

The preform 66 is then placed in a die (not shown) and the rope portion 68 is compressed by the die to form the lip 24, FIG. 3. The lip 24 is substantially a double thickness of wire mesh and is sufficiently rigid to retain the ceramic catalytic element 6 in the axial position, FIG. 1. The lip 24 may also include a portion of the rope 34 formed with the lip adding to the rigidity of the lip.

While two devices 8, 8' are shown, in the alternative, one device may be fabricated with a lip such as lip 24 at opposite end edges (not shown). Also, while the cylindrical portions of the devices 8, 8' are shown coextensive with and overlying the entire axial length of the element 6, the devices may be shorter in length than shown and may form a cushion solely at each end of the element 6 in a manner not shown.

The rope portion 72 of the device 8, FIGS. 1 and 3, abuts the shoulder 18 of the housing 4 in the channel 20. The portion 72 thus retains the devices 8, 8' in the housing channel 20. The lips 24 retain the element 6 in the axial directions. The corrugations on the devices 8, 8' cushion radial shock loads on the element 6. The rope 38, FIG. 1, is substantially gas impervious and substantially precludes exhaust gases from axially flowing between the ceramic element 6 and the housing 4 through the devices 8, 8'.

It should be understood that while the rope 38 is desired to be gas impervious, because of its compressed filament structure including tortuous knitted wire, minor gas leakage through the rope might occur. The goal is to preclude gas flow through the rope. Due to its structure, however, some porosity may exist. This porosity should be minimized as much as possible. One way to minimize such leakage is to enhance the metal wires with the fibers of other materials forming a composite structure as discussed above.

By way of example, the lip 24 may have an internal diameter of 102 mm (about 4 inches) and the corrugated cylinder 22' may have an inner diameter of about 106 mm (about 4.2 inches).

While the devices 8, 8' are illustrated as fabricated from tubular knitted wire mesh, they may be fabricated with other mesh materials such as a single layer knitted mesh or multiple layers greater than two. Also, the mesh need not be knitted but may take other forms. The resulting device 8 is simple to fabricate and is cost effective. Also, by being entirely wire mesh, it is relatively durable.

It will occur to one of ordinary skill that various modifications to the disclosed devices may be made. The description made herein is by way of illustration and not limitation. It is intended that the scope of the invention be defined by the appended claims.

What is claimed is:

1. A device for supporting a ceramic catalytic element in a housing of an exhaust gas treatment apparatus, the element having an outer surface and an end face forming a first corner with said outer surface, said gas tending to flow in a first direction in the interface between the housing and element, said device comprising:

a mesh member (8, 8') having a side extending in a second direction parallel to said first direction and terminating at opposing ends for supporting at least a portion of said element at said outer surface in juxtaposed relation at the interface between the housing and element outer surface;

said mesh member (8, 8') having a conduit formed therein extending transverse said first and second directions; and a fluid sealing elongated member (8, 8') in the conduit and comprising filaments compressed to be substantially fluid impervious for sealing the interface between said housing and said element to preclude said gas flow between the housing and element.

2. The device of claim 1 including a lip formed integral with said mesh member (8, 8') at one mesh member (8, 8') end for juxtaposition with said element end face, said lip extending transverse to said mesh member (8, 8') side forming a mesh member (8, 8') second corner therewith for receiving said element first corner.

3. The device of claim 2 wherein the conduit (62) and elongated member are at said mesh member (8, 8') second corner.

4. The device of claim 1 wherein the mesh member (8, 8') is knitted wire mesh.

5. The device of claim 1 wherein the filaments of the elongated member comprise wire mesh.

6. The device of claim 1 wherein the filaments of the elongated member and the mesh member (8, 8') comprise knitted wire mesh.

7. The device of claim 6 wherein the elongated member and the mesh member (8, 8') each comprise wire, wherein the elongated member wire comprises a finer gauge than the mesh member (8, 8') wire.

8. The device of claim 1 wherein the conduit (62) and elongated member are at one of the mesh member (8, 8') ends.

9. The device of claim 1 wherein the filaments of the elongated member comprise a composite material including tortuous wire filaments and fibers formed into a rope.

10. The device of claim 1 wherein the mesh member is corrugated.

11. The device of claim 10 wherein the corrugations extend in the second direction.

12. The device of claim 11 wherein the corrugations are inclined relative to said second direction.

13. The device of claim 1 wherein the mesh member (8, 8') comprises a double layer of knitted wire mesh.

14. The device of claim 1 wherein the mesh member (8, 8') has opposing lateral side edge regions extending to and between said opposing ends, the end regions being secured together to form a cylindrical mesh member.

15. The device of claim 14 wherein the mesh member (8, 8') is metal and overlaps at said lateral side edge regions and includes at least one weld to secure said overlapping regions.

16. A support device for a ceramic catalytic element in a gas treatment apparatus, said element having an outer surface and a transverse end face forming a first corner with said outer surface, said device comprising:

a cylindrical knitted wire mesh member (8, 8') having a side extending to opposing ends in a given direction for supporting said element surface in juxtaposed relation;

a lip formed integral with said mesh member (8, 8') at one member end for juxtaposition with said element end face, said lip extending generally radially inwardly and transverse to said mesh member (8, 8') side forming a second corner therewith for receiving said element first corner;

said member (8, 8') having an annular conduit (62) formed in said mesh member (8, 8') lying in a plane transverse to said given direction; and a fluid sealing rope formed of filaments in said conduit (62).

17. The device of claim 16 wherein the filaments forming the rope and the mesh member (8, 8') each comprise knitted wire mesh.

18. The device of claim 16 wherein the rope knitted wire is compressed to be substantially fluid impervious.

19. The device of claim 17 wherein the mesh member (8, 8') and the rope each comprise wire, the wire of said mesh member (8, 8') being larger in diameter than the wire of the rope.

20. A catalytic converter apparatus comprising:

a cylindrical metal housing for receiving hot gases in a given direction;

a cylindrical ceramic hot gas purifying element in the housing, said element having a radially outer peripheral surface and an end face normal to the outer peripheral surface and forming a first corner therewith;

a cylindrical knitted wire mesh member (8, 8') disposed between the element and the housing for supporting the element, said mesh member (8, 8') being formed with an internal annular conduit (62) at one end at said corner;

a lip formed one piece with the mesh member (8, 8') forming a second corner therewith and juxtaposed with the ceramic element end face, said mesh member (8, 8') second corner for receiving said element first corner; and a knitted wire rope compressed to be substantially fluid impervious disposed in said conduit (62) for fluid sealing the interface between said element and said housing from said gas received in said given direction.

* * * * *